June 10, 1924.  B. G. SINCLAIR  1,497,033
REMOVABLE END BAKING TIN
Filed Aug. 2, 1923
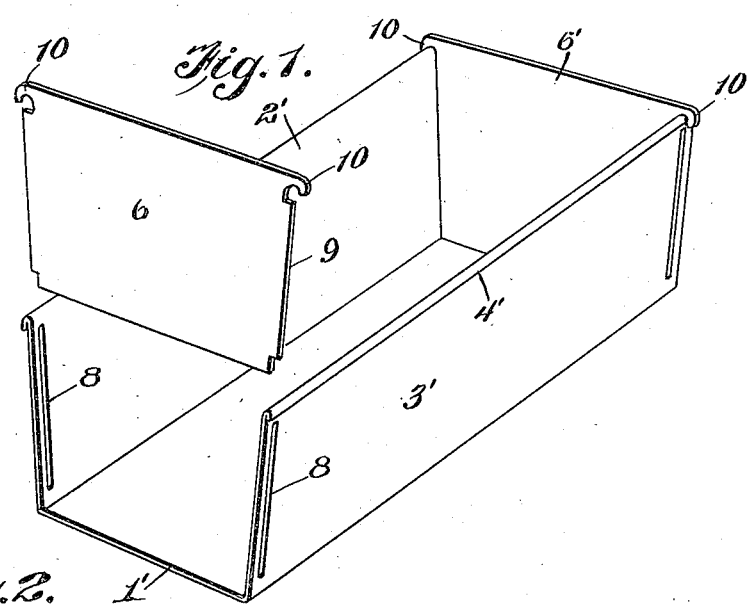
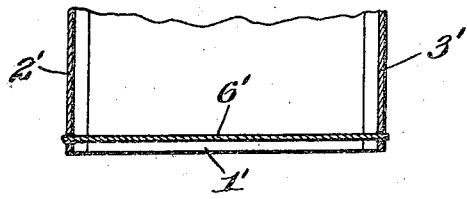
Inventor
Bliss G. Sinclair
F. P. Gorin
Atty Patented June 10, 1924.

1,497,033

UNITED STATES PATENT OFFICE.

BLISS G. SINCLAIR, OF LA GRANDE, WASHINGTON.

REMOVABLE-END BAKING TIN.

Application filed August 2, 1923. Serial No. 655,352.

*To all whom it may concern:*

Be it known that BLISS G. SINCLAIR, citizen of the United States, residing at La Grande, in the county of Pierce and State of Washington, has invented certain new and useful Improvements in Removable-End Baking Tins, of which the following is a specification.

This invention relates to an improvement in containers used in the baking art, and particularly in the baking of bread, cakes, and similar products.

The invention is particularly directed to a baking container or pan, in which the bottom and at least two sides are formed integral or permanently connected, with the remaining sides or ends removably secured in position so that when applied, the baking tin is complete in itself for baking purposes, and when removed, the material baked is capable of being readily removed from the tin, and furthermore, the interior of the tin is fully open to permit convenient and proper cleaning.

The invention is illustrated in the accompanying drawings, in which:

Fig. 1 is a perspective view of a baking container constructed in accordance with the invention.

Fig. 2 is a horizontal section through one end of the same.

The drawing shows a baking tin in which the sides 2' and 3' are integral with the bottom 1' but flare therefrom, that is, extend upwardly at an angle greater than a right angle to the bottom 1. The upper ends of the sides 2' and 3' are rolled at 4', and said sides are formed near their ends with vertically extending slots 8, which terminate within the upper and lower margins of the sides and arranged immediately adjacent the free edges of the sides, as shown in Fig. 2. The removable end sections 6' have their normal closing end plates extended to form lips 9 of a size to engage with the slots 8 when the ends are moved downwardly into place. The lips 9 are interrupted near their upper edges of the ends 6', and said upper edges of the ends are extended to provide engaging portions 10 curved on their under sides to engage and overlie the rolled edges 4' of the container when the ends are in position.

From the above, it will be apparent that the ends are readily and conveniently removed when necessary either for cleaning or for the removal of the material baked in the pan. With the ends removed, the interior of the pan is without obstruction and can be readily scraped to remove burnt particles or otherwise cleaned in a simple convenient manner. The connection of the removable ends with the sides lock said sides against distention or spreading, as will be apparent from the drawings and thus the weight of material within the container will not effect the container.

The invention is preferably for a pan of rectangular shape, though it is obvious that the invention may be applied to pans of other shapes and sections made removable therefrom in order to provide access to the interior in a manner similar to that illustrated in the drawings.

Claims:

1. In an article of the class described, a bottom, side walls projecting upwardly therefrom and having their upper edges of rolled formation, the side walls being formed adjacent each free end with slots extending parallel to such end and throughout the greater portion of the height of such side walls, and an end member having edge projections to seat in such slots in the application of such end member, the upper portion of the end member being recessed to receive the rolled edge of the side walls.

2. In an article of the class described, a bottom, side walls projecting upwardly therefrom and having their upper edges of rolled formation, the side walls being formed adjacent each free end with slots extending parallel to such end and throughout the greater portion of the height of such side walls, and an end member having edge projections to seat in such slots in the application of such end member, the upper portion of the end member being recessed to receive the rolled edge of the side walls and formed with projections above the recesses to overlie and bear on the outer sides of the rolled portions of the side walls.

In testimony whereof I affix my signature.

BLISS G. SINCLAIR.